(12) United States Patent
Rajendran et al.

(10) Patent No.: US 10,281,575 B2
(45) Date of Patent: May 7, 2019

(54) METHOD, SYSTEM AND DEVICE FOR RADAR BASED HIGH RESOLUTION OBJECT DETECTION

(71) Applicant: STERADIAN SEMICONDUCTORS PRIVATE LIMITED, Bangalore (IN)

(72) Inventors: Gireesh Rajendran, Bangalore (IN); Apu Sivadas, Bangalore (IN)

(73) Assignee: Steradian Semiconductors Private Limited, Bangalore ( * ) Notice: Subject to any disclaimer, the term of this patent is extended or adjusted under 35 U.S.C. 154(b) by 335 days.

(21) Appl. No.: 15/365,984

(22) Filed: Dec. 1, 2016

(65) Prior Publication Data

US 2018/0088229 A1 Mar. 29, 2018

(30) Foreign Application Priority Data

Sep. 27, 2016 (IN) .............................. 201641032883

(51) Int. Cl.
| | |
|---|---|
| *G01S 13/18* | (2006.01) |
| *G01S 13/58* | (2006.01) |
| *G01S 13/89* | (2006.01) |
| *G01S 7/285* | (2006.01) |

(52) U.S. Cl.
CPC .............. *G01S 13/89* (2013.01); *G01S 7/285* (2013.01); *G01S 13/18* (2013.01); *G01S 13/582* (2013.01)

(58) Field of Classification Search
CPC ........ G01S 7/285; G01S 13/18; G01S 13/582; G01S 13/89; G01S 7/292; G01S 7/2921; G01S 7/2923; G01S 13/931
See application file for complete search history.

(56) References Cited

U.S. PATENT DOCUMENTS

| | | | | |
|---|---|---|---|---|
| 4,106,019 A | * | 8/1978 | Alexander | G01S 7/2923 342/108 |
| 4,400,700 A | * | 8/1983 | Rittenbach | G01S 7/415 342/100 |
| 4,717,916 A | * | 1/1988 | Adams | G01S 13/4454 342/107 |
| 4,916,452 A | * | 4/1990 | Borchert | G01S 13/24 342/109 |
| 4,978,960 A | * | 12/1990 | Newcomb | G01S 13/4454 342/191 |
| 5,374,931 A | * | 12/1994 | Wiener | G01S 13/581 342/115 |

(Continued)

*Primary Examiner* — Peter M Bythrow

(57) ABSTRACT

In an embodiment of the present disclosure, a Radar transceiver for object detection comprises a two dimensional antenna array receiving plurality of a reflected radio frequency (RF) signals, a mux-adder selectively adding the reflected RF signals in first mode and selectively multiplexing the reflected RF signals in a second mode, a range bin detector determining a valid range bins in the first mode and a three dimensional (3D) image reconstructor operating on the valid range bins to reconstruct a 3D image of the object in the second mode. In that the two dimensional antenna array comprises antenna elements arranged in K rows and M columns, and the mux-adder adds a RF signal received on the M columns of each row in the first mode. The mux-adder multiplexes the RF signal received on the M columns of each row in the second mode.

17 Claims, 6 Drawing Sheets

(56) References Cited

U.S. PATENT DOCUMENTS

| | | | | |
|---|---|---|---|---|
| 5,825,898 A * | 10/1998 | Marash | ................ | G01S 7/2813 |
| | | | | 381/92 |
| 5,831,570 A * | 11/1998 | Ammar | ................ | F41G 7/2226 |
| | | | | 342/26 B |
| 6,081,225 A * | 6/2000 | Tsai | ........................ | G01S 7/285 |
| | | | | 342/175 |
| 6,407,694 B1 * | 6/2002 | Cox | ........................ | G01S 7/285 |
| | | | | 342/13 |
| 9,746,549 B1 * | 8/2017 | Parker | ................... | G01S 13/5244 |
| 2011/0102244 A1 * | 5/2011 | Jales | ........................ | G01S 7/062 |
| | | | | 342/135 |
| 2011/0279305 A1 * | 11/2011 | Lellouch | ................ | G01S 7/003 |
| | | | | 342/107 |
| 2014/0022114 A1 * | 1/2014 | Kamimura | .............. | G01S 7/285 |
| | | | | 342/134 |
| 2015/0247924 A1 * | 9/2015 | Kishigami | ............ | G01S 13/931 |
| | | | | 342/70 |
| 2016/0363648 A1 * | 12/2016 | Mindell | ................ | H04W 4/029 |
| 2016/0377711 A1 * | 12/2016 | Arage | .................... | G01S 7/285 |
| | | | | 342/118 |
| 2017/0054449 A1 * | 2/2017 | Mani | ................... | H03M 7/4075 |
| 2017/0153316 A1 * | 6/2017 | Wintermantel | ....... | G01S 7/2923 |

\* cited by examiner

METHOD, SYSTEM AND DEVICE FOR RADAR BASED HIGH RESOLUTION OBJECT DETECTION

CROSS REFERENCES TO RELATED APPLICATIONS

This application claims priority from Indian patent application No. 201641032883 filed on Sep. 27, 2016 which is incorporated herein in its entirety by reference.

BACKGROUND

Technical Field

The present disclosure relates generally to signal processing and more specifically to method, system and device for Radar based high resolution object detection.

Related Art

Radar often refers to technique of detecting an object by radio waves. In that, a known radio frequency signal is transmitted and the object is detected from the reflected signal. In an improved RADAR system, one dimensional (1D) and two dimensional (2D) arrays of antennas and corresponding number of receivers are employed to extract 1D and 2D information of the object. Conventional effort to reduce hardware in terms of number of receiver per antenna includes a time switched antenna system. It that, the receiver chain with Doppler compensation is connected to each antenna sequentially. The digital beam forming with the full data set is performed after compensating for the Doppler. In such system, Doppler estimation and compensation are to be performed before the digital beam forming and object detection. Such systems typically employ three dimensional FFT search technique along with velocity or Doppler search to resolve the object location in 3D. As a result, such implementation is complex in terms hardware, and inefficient. In another conventional transceiver system, a time switched array of transmitting antenna and receiving antenna are together used obtain better antenna aperture over time. Redundant antenna positions that continuously transmit and receive the signals are used for estimating and removing impact of the object movement. However, such systems are sensitive to any noise and error in the continuously active transmit/receive antennas and associated circuits. The performance of such a system is generally inferior in terms of degraded accuracy compared to systems that uses information from all the antennas for object movement compensation and 3D location identification. Some of the state of art object detection techniques are more fully described in the U.S. Pat. Nos. 7,474,262, 8,390,507, publication US20140347211 and in a technical paper titled "A 77-Ghz FMCW MIMO Radar Based on an SiGe Single chip Transceiver" authored by Reinhard Feger et. al, and published in IEEE TRANSACTIONS ON MICROWAVE THEORY AND TECHNIQUES, VOL. 57, NO. 5, May 2009.

SUMMARY

In an embodiment of the present disclosure, a Radar transceiver for object detection comprises a two dimensional antenna array receiving plurality of a reflected radio frequency (RF) signals, a mux-adder selectively adding the reflected RF signals in first mode and selectively multiplexing the reflected RF signals in a second mode, a range bin detector determining a valid range bins in the first mode and a three dimensional (3D) image reconstructor operating on the valid range bins to reconstruct a 3D image of the object in the second mode. In that the two dimensional antenna array comprises antenna elements arranged in K rows and M columns, and the mux-adder adds a RF signal received on the M columns of each row in the first mode. The mux-adder multiplexes the RF signal received on the M columns of each row in the second mode.

Further, the radar transceiver further comprises K number of circuit blocks each for adding corresponding RF signals received on the K rows in the first mode and multiplexing in the second mode. In that, the first mode is operative over a first chirp and the second mode is operative over the M chirps. The radar transceiver also comprises K number of RF receivers each converting the RF signal from K number of circuit blocks to digital data sequence. In that, the 3D image reconstructor comprising a high speed narrow band filter operative over the valid range bins.

BRIEF DESCRIPTION OF DRAWINGS

Example embodiments will be described with reference to the accompanying drawings briefly described below.

DETAILED DESCRIPTION OF THE PREFERRED EMBODIMENTS

Various embodiments are described below with several examples for illustration.

Figure 1:
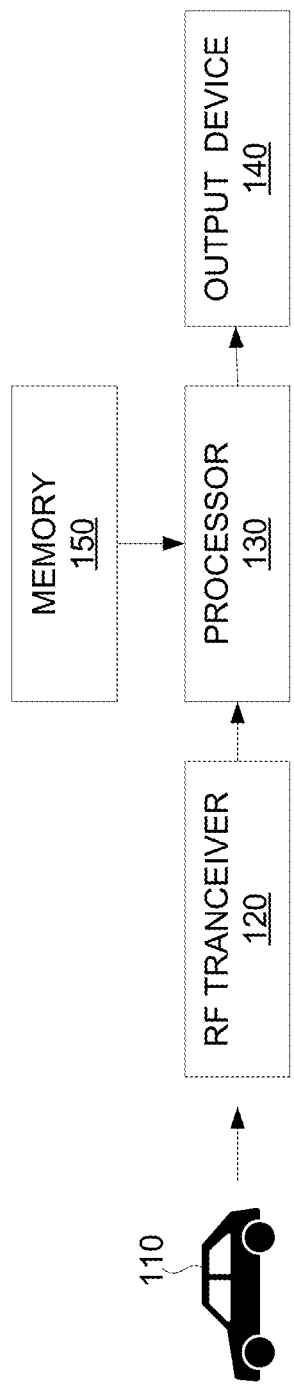
FIG. 1 is a block diagram of an example system 100 or environment in which various aspects of the present invention may be seen.

FIG. 1 is a block diagram of an example system 100 (environment) in which various aspects of the present invention may be seen. The environment is shown comprising an object 110, Radio Frequency (RF) transceiver 120, processor 130, output device 140 and memory 150. Each element in the system 100 is further described below.

RF transceiver 120 transmits a RF signal over a desired direction(s) and receives a reflected RF signal that is reflected by the object 110. In one embodiment, the RF transceiver 120 may employ multiple (one or more) receiving antennas to receive the reflected RF signal and multiple (one or more) transmitting antenna for transmitting the RF signal. Accordingly, the transceiver 120 may employ these multiple transmitting/receiving antennas in several of multiple input and multiple output (MIMO) configurations to form desired transmitting and receiving RF signal beam (often referred to as Beam forming) to detect objected from the reflected signal. The object 110 may comprise a single object, cluster of objects, multiple disconnected objects, stationary object, moving object, live objects etc.

Processor 130 conditions and process the received reflected RF signal to detect one or more objects (for example 110) and determine one or more properties of the objects. The properties of the object thus determined (like shape, size, relative distance etc.) are provided to the output device 140. In an embodiment, the processor 130 comprises signal conditioner to perform signal conditioning operations and provided the processed RF signal for digital processing. The memory 150 may store RF signal information like samples of the reflected RF signal for processing. The processor 130 may temporarily store received data, signal samples intermediate data, results of mathematical operations, etc., in the memory 150 (such as buffers, registers). In an embodiment, processor 130 may comprise group of signal processing blocks each performing the specific operations on the received signal and together operative to detect object and its characteristics/properties.

The output device 140 comprises navigation control electronics, display device, decision making electronic circuitry and other controllers respectively for navigation, display and further processing the received object details. Accordingly, the system 100 may be deployed as part of unmanned vehicles, driver assistant systems for example for obstacle detection, navigation and control.

In an embodiment, the RF transceiver 120, processor 130, and memory 150 are implemented as part of an integrated circuit integrating with other functionality and/or as an single chip integrated circuit with interfaces for external connectivity like the output device 140. The manner in which the transceiver 120 and the processor 130 (together referred to as Radar transceiver) may be implemented in an embodiment is further described below.

Figure 2:
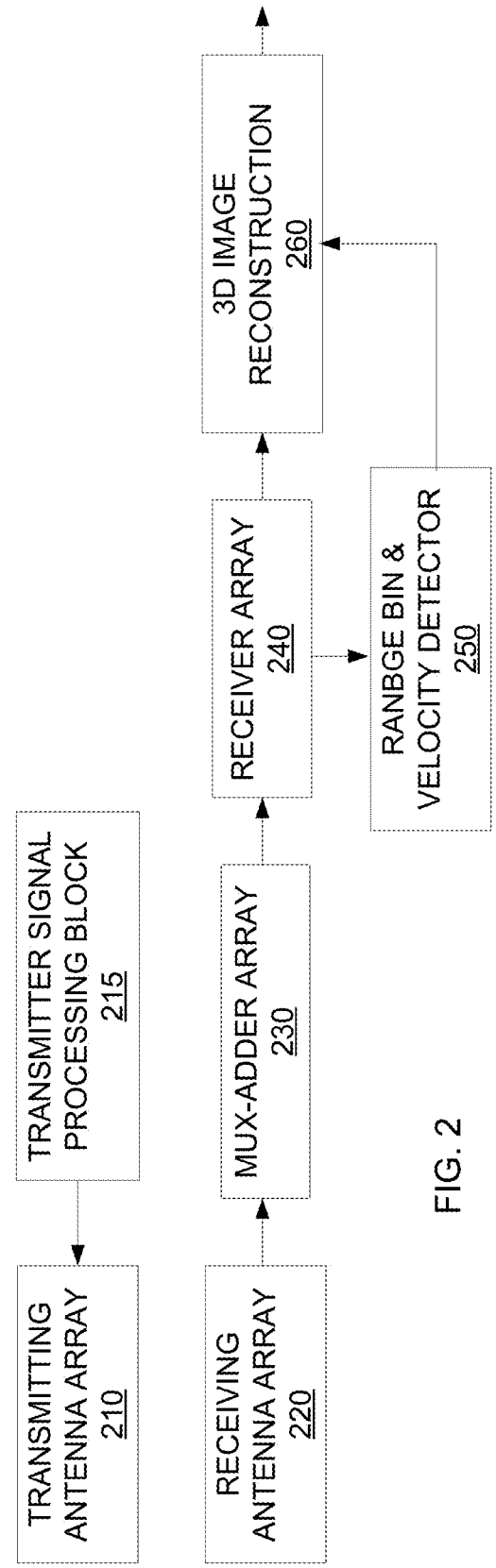
FIG. 2 is an example transceiver for object detection and recognition in an embodiment.

FIG. 2 is an example Radar transceiver for object detection and recognition in an embodiment. The Radar transceiver is shown comprising transmitting antenna array 210, transmitter Block 215, receiving antenna array 220, multiplexer and adder (Mux-Adder) Array 230, receiver array 240, range bin and velocity detector 250, 3D Image/point cloud reconstruction block (3D image reconstruction) 260. Each element is described below in further detail.

The transmitting antenna array 210 and the transmitter 215 operate in conjunction to transmit RF signal over a desired direction. The transmitting antenna array is employed to form a transmit beam with an antenna aperture to illuminate objects at suitable distance and of suitable size. Various known beam forming technique may be employed for changing the illuminated region. The transmitting antenna array 210 may comprise any of single transmitting antennas, array of 1×T transmitting antennas, two-dimensional array of S×T transmitting antennas. Accordingly, the transmitter 215 selectively activates one or more antennas to form RF beam over the object area.

Receiving antenna array 220 comprises elements arranged in rows and columns with each element capable of receiving reflected RF signal. For example, the elements may be arranged in M rows and K columns forming a two dimensional array of M×K antenna elements. The RF signal received on each element is provided to the Mux-adder array 230.

The Mux-adder array 230 receives the RF signal from the receiving antenna array 220 and selectively performs one of multiplexing operation and adder operation on the sequence of received RF signal received from the antenna array elements. In one embodiment, the Mux-adder array 230 provides one output for every row or column of antenna elements. For example, in respect of M×K receiving antenna elements, the Mux-adder array 230 provides K outputs corresponding K columns of antenna element. Each output may represent summation of M signals received on the corresponding M row elements of the particular column. Alternatively, each K output may represent the time multiplexed sequence of the RF signal received on the M row elements of a particular column.

Receiver array 240 processes the signal and converts each K output received from the K Mux-adder to corresponding digital data sets. The receiver array 240 may comprise K number of signal processing circuitry to simultaneously process each output stream of the Mux-adder array 230. The processed and converted digital data is provided to one of the range bin and velocity detector 250 and 3D image reconstruction block 260. For example, when the Mux-adder array 230 is configured to perform adder operation, the digital data from the receiver array 240 is provided to the range bin and velocity detector 250. In the adder mode, the Mux-adder array 230 combines data from M×K array to K array. In one embodiment, this K outputs are sampled synchronously and combined to form a single stream of data (within the receiver 240). This combined M×K synchronous array data does not suffer from any signal to noise ratio degradation or velocity estimation error compared to a conventional, redundant always ON antenna element technique. When the Mux-adder array 230 is configured to perform multiplexer operation, the digital data from the receiver array 240 is provided to 3D image reconstruction block 260.

The range bin and velocity detector 250 performs 1D object detection on the digital data received from the receiver array 240. Accordingly, range bin detector 250 determines the range bins (frequency components) of the objects detected. The determined range bin and the velocity are provided to the 3D image reconstruction block 260. Further, the determined 1D object information may be provided to output device 140, for example to primary navigation control.

The 3D image reconstruction block 260 performs 2D objects detection on the digital data received from the receiver array 240 over the range bins received from the range bin and velocity detector 250. In one embodiment, the 3D image reconstruction block 260 perform N×K filter operation over the range bins determined by the range bin and velocity detector 250 rather than over the entire available range bins. Thus, the computational time and complexity is reduced and thereby providing ability to increase number of antenna elements and increase the antenna aperture for high resolution image detection which otherwise is a limitation. Further, the transceiver may be dynamically configured to determine the 1D and/or 2D. The 3D image reconstruction block 260 may be activated upon detection of range bins. The transceiver therefore can be scaled and dynamically adapted for high and low resolution object detection. The manner in which the receiving antenna Array 220, the Mux-adder array 230, the receiver array 240, the range bin and velocity detector 250, and the 3D image reconstruction block 260 operate in conjunction to reduce at least hardware/computational complexity and provide scalability to the object detection is further described below.

Figure 3:
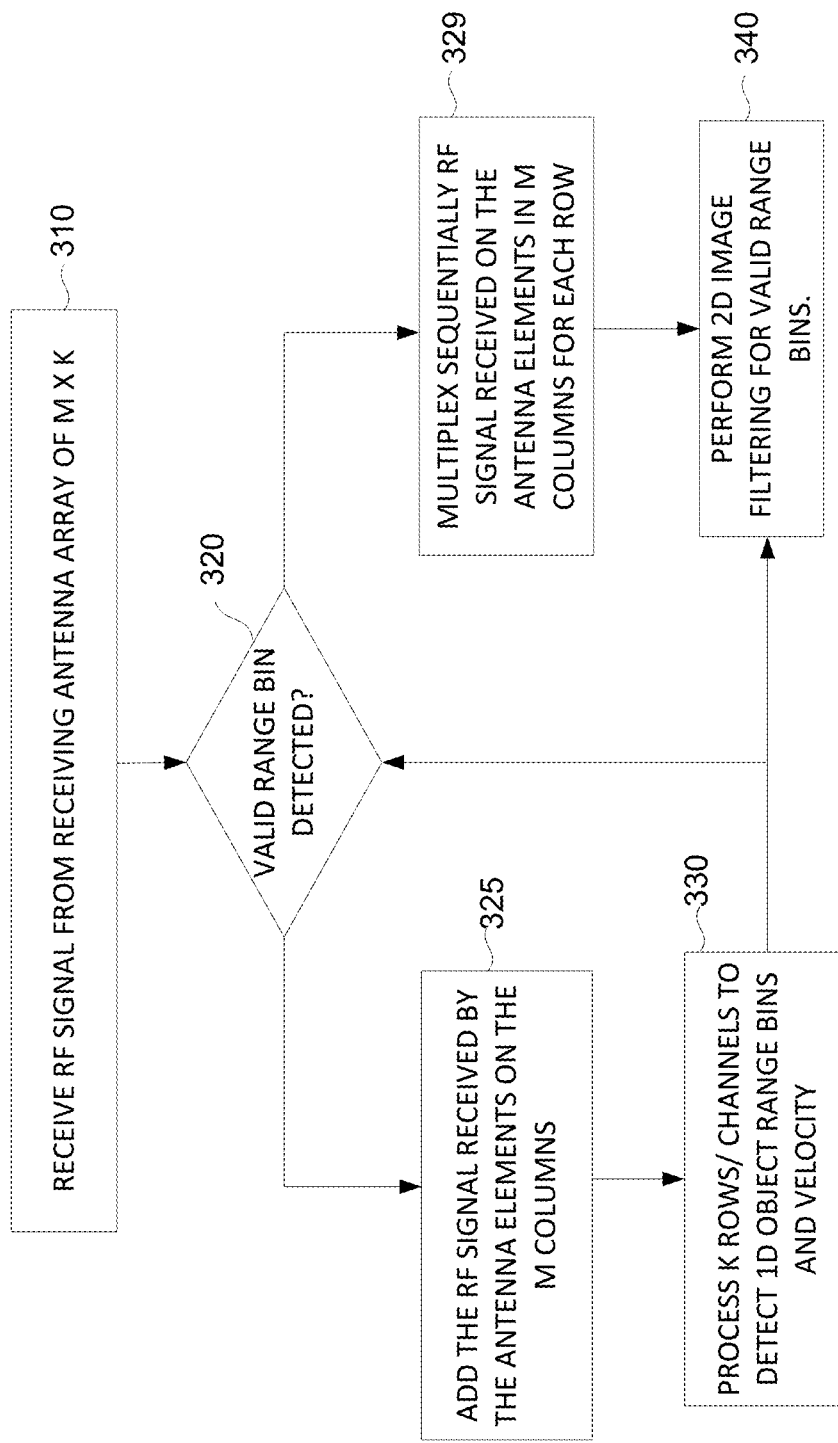
FIG. 3 is a block diagram illustrating the manner in which the object may be detected in an embodiment.

FIG. 3 is a block diagram illustrating the manner in which the object may be detected in an embodiment. In block 310, the K×M antenna array receives corresponding number of RF signals. In block 320, the processor determines if valid range bins is/are detected within a chirp time. If the range bin is detected, then the control passes to block 325 and the control passes to block 329 otherwise. In block 325 a set of K, 1×M adders respectively add the RF signal received by the antenna elements on M columns of each K row. In block 329, the multiplexer sequentially produces the samples of RF signal received on the antenna elements in M columns for each K row. In block 330, the range bin detector performs 1D object and velocity detection from the K, 1×M adder output and determines the range bins and velocity of the detected object(s). In block 340, the high frequency narrow band filter detects 2D object detection by operating over the range bins of three detected object. The sequence of operations may be executed within a processor 130 in one embodiment.

Figure 4:
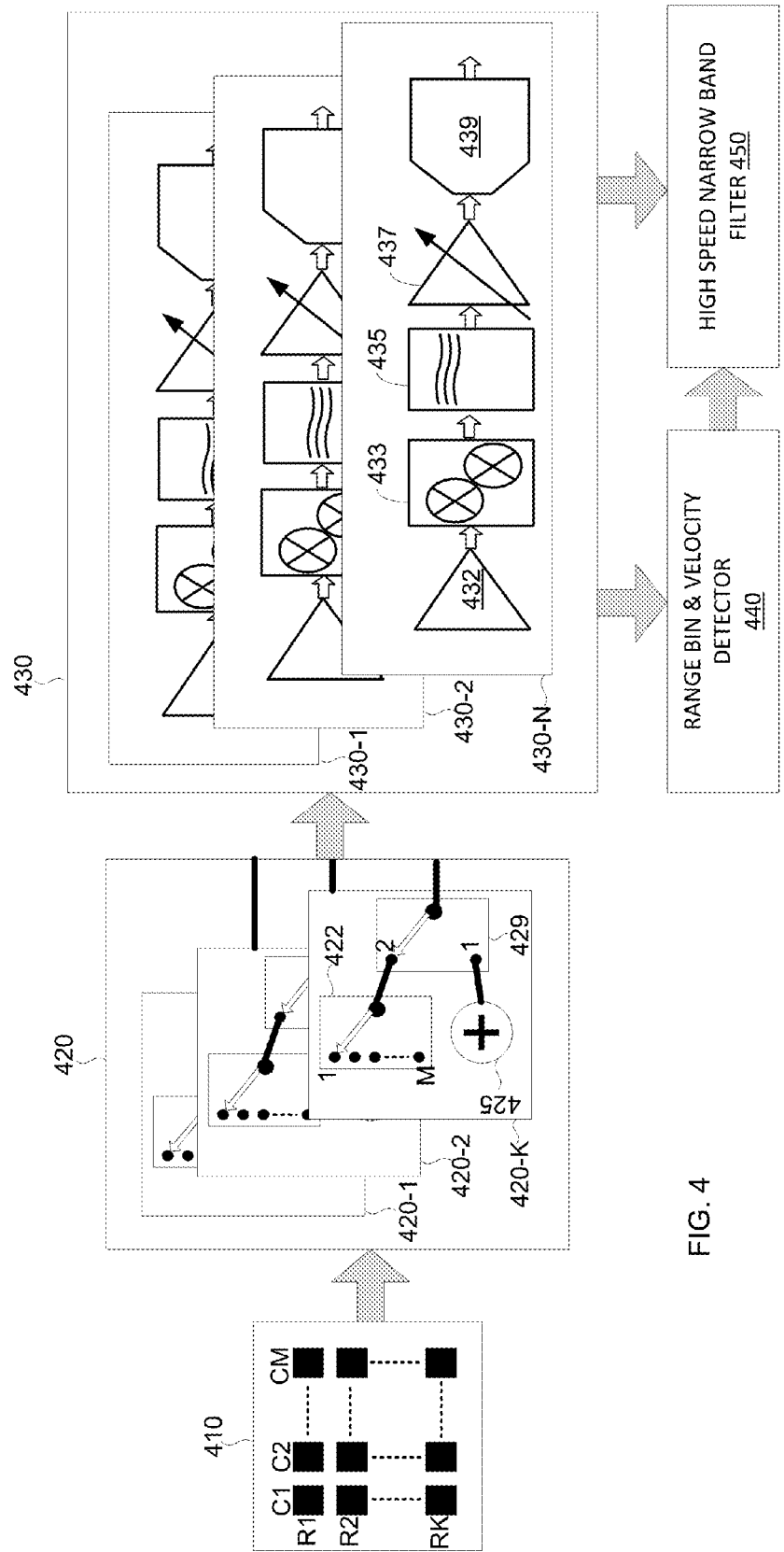
FIG. 4 is an integrated circuit of a transceiver in an embodiment.

FIG. 4 is an integrated circuit of a Radar transceiver in an embodiment. The integrated circuit is shown comprising Array antenna elements 410, dual mode circuits 420, RF receiver circuits 430, range bin and velocity detector 440, and high speed narrow band filter 450.

The array antenna element 410 is shown arranged in rows R1 through RK and in columns C1 through CM thus forming K×M antenna array. Each element is identified by its row and column position as A(k,l) in the k represents the row and l represents the column. The antenna array may be implemented with suitable cross section area based on the frequency of operation of the receiver. For example, the cross sectional area may be selected to be quarter of the wavelength for efficient reception of the RF signal and the spacing between the rows (and/or columns) may be selected to be multiple of the radar signal wavelength in the material and/or close to the free space wavelength.

The dual mode circuits 420 is shown comprising 420-1 through 420-K circuit blocks. Each block 420-1 through 420-K is shown comprising multiplexer 422, adder 425 and mode select switch 429. The blocks 420-1, through 420-K are respectively coupled to the rows R1 through RK. Accordingly, each block 420-1 through 420-K receives the RF signal from the antenna elements on respective rows. For example, the block 420-1 receives the M number of RF signals from the antenna elements A(1,1) through A(1,M). The M number of RF signals are coupled to multiplexer 422 and adder 425 in each block 420-1 through 420-K. The switch couples output of the adder 425 or output of the multiplexer 422 to the respective output of the block 420-1 through 420-K.

RF receiver circuits 430 is shown comprising receiver blocks 430-1 through 430-K and each comprising low noise amplifier (LNA) 432, mixer 433, band pass filter (BPF) 435, variable gain amplifier (VGA) 437 and analog to digital convertor (ADC) 439. The receiver block 430-1 through 430-K respectively receives outputs of the dual mode circuit blocks 420-1 through 420-K. For example, the output of block 420-1 is provided as input to the 430-1. The LNA 432, mixer 433, BPF 435, VGA 437 and ADC 439 perform respective operation on the RF signal as is well known in the art and generate corresponding digital data for digital processing. The output of the RF receiver circuits 430 is selectively coupled to one of the range bin detector 440 or high speed narrow band filter 450. The coupling may be controlled by the processor 130 or a logic circuit (not shown). For example, the receiver blocks 430-1 receives sum of the RF signal samples on the antenna element A(1,1) through A(1,M) when the switch 429 is in the first position (coupling the adder 425 output). On the other hand the receiver blocks 430-1 receives sequenced M samples of RF signal correspondingly received on the antenna element A(1,1) through A(1,M) when the switch 429 is in the second position (coupling the multiplexer 422 output).

The range bin and velocity detector 440 performs 1D object detection by applying one dimensional FFT (Fast Fourier Transform) operation for example. Velocity of the object is detected by comparing valid bin 1D FFT Phase drift over time. The range bins of the object and velocity thus detected is provided to the high speed narrow band filters for further processing. In one embodiment the range bin and velocity detector 440 operates on the summed K number of RF signals received from the receiver block 430-1 through 430-K. For example, sum of the RF signal received on the antenna element A(1,1) through A(1,M), sum of the RF signal received on the antenna element A(2,1) through A(2,M), so on. The P number of relevant range bins is provided to the high speed narrow band filter 450.

High speed narrow band filter 450 extract range specific, per receive antenna element data, compensates for bin velocity received from 440, that may be used for 2D image reconstruction over valid range. Any correlation technique that relies on the phase information per antenna element from a scene can be used to reconstruct the 2D image from this data The high speed narrow band filter 450 receives sequenced samples of RF signal received on the antenna elements when the switch is in the second position. For example, the RF signal samples on the antenna element A(1,1) through A(1,M), RF signal samples on the antenna element A(2,1) through A(2,M) and so on. In one embodiment, the high speed narrow band filter may extract valid spectrum of object and compensates bin velocity using relation:

$$\begin{bmatrix} \text{Valid per element} \\ \text{per object data} \end{bmatrix} = \sum_{p=N1}^{N2} e^{j(-Vprx(n))} \sum_{n=0}^{N} RX(n*Ts) * e^{j(-\frac{2\pi pn}{N})}$$

In that, N1 and N2 represents the valid range bins received from the range bin and velocity detector 440. N represents the total number of range bins, RX(n*Ts) represents the nth sample sampled at every Ts interval received per antenna, Vprx represents the phase velocity of pth bin from 440 and other expression taking the general meaning in the relevant art.

The 2D image reconstruction is performed over only on the N1 through N2 range bins. 2D image reconstruction may be performed using any known technique. Thus, reducing the overall computational complexity and not requiring employing 3D FFT object detection technique. The manner in which the signal is processed is further described with an example.

Figure 5A:
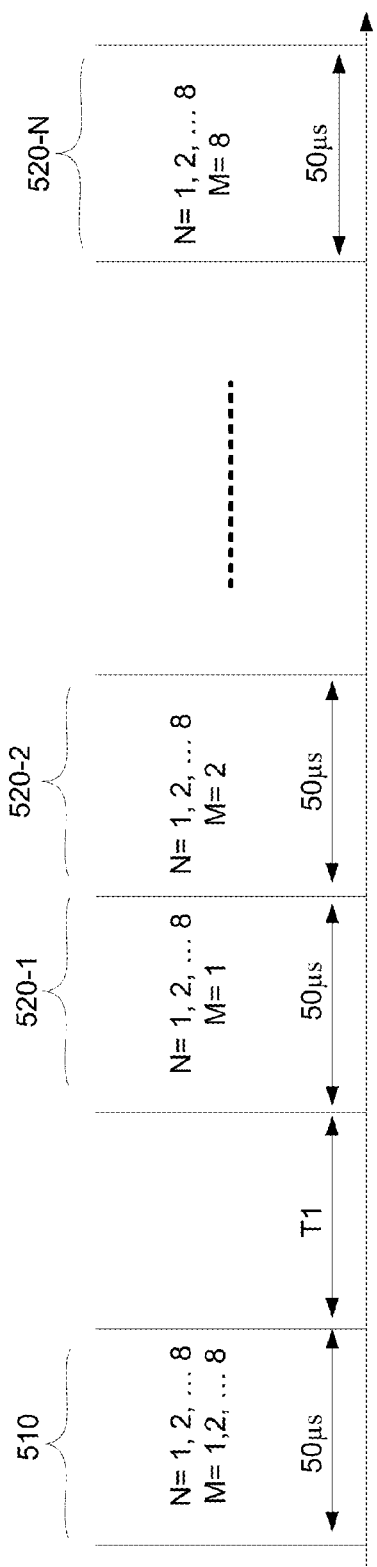
FIG. 5A is a chart illustrating object detection with an example 8×8 antenna array in an embodiment.

FIG. 5A is a chart illustrating object detection with an example 8×8 antenna array in an embodiment. The chart shown with the chirps 510, and 520-1 through 520-N. Each chirp, a RF frequency sweep signal is of 50 microseconds, for example. The RF signal is transmitted using transmitting antenna array 210. The reflected RF signal is received on the receiving antenna array 410 of 8 rows and 8 columns (8×8), for example.

In the time duration 510 and T1 (mode 1), the dual mode circuits 420 operate as adder and accordingly the switch 429 is set to first position. The dual mode circuits 420 generate the summed M RF signal received over each column of a row. The signal received from the dual mode circuits 420 may be represented as:

Mode 1 output(k)=$\Sigma_{l=1}^{l=M} A_{(k,l)}$ for every k=1 through K.

Figure 5B:
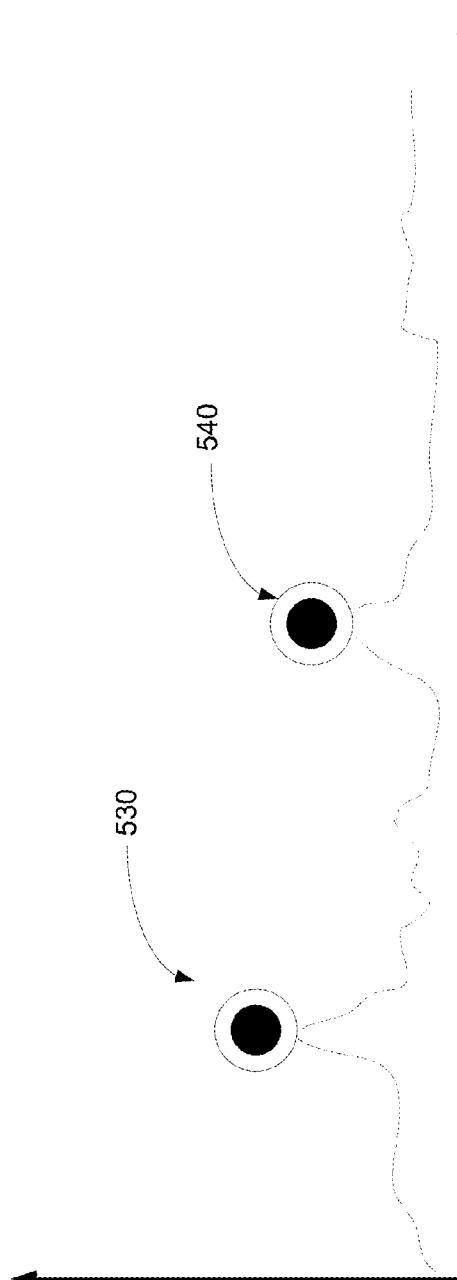
FIG. 5B is a graph illustrating example range bins detected in mode 1.

The mode (1) K outputs are coupled to the receiver circuits 430 for processing and converting to digital data. The digital data is provided to the range bin and velocity detector 440. The range bin and velocity detector may detect multiple objects at multiple ranges. Velocity of the bin is estimated by comparing valid bin Phase drift over time. An example range detection using FFT technique is depicted in FIG. 5B, only FFT magnitude is shown for illustration. As shown there the objects are detected in the ranges 530 and 540. Each range 530 and 540 may comprise few range bins depending on the size of the objects and relative distance.

Upon detecting object range bins, the switch is shifted to position 429 (mode 2) as a result the dual mode circuits 420 operate as multiplexer and generate the output in sequence. The multiplexer 422 is synchronised with the chirp frequency, accordingly, in each chirp interval 520-1 through 520-M, the dual mode circuits 420 outputs the RF signal samples received on the column C1 through CM. The mode 2 output signal may be represented as:

Mode 2 output$(k)=(A_1,A_2,\ldots A_8)$ for every $m=1$ through $M$.

In this case M=8 and the mode (2) output is completed in 520-8th chirp.

The mode (2) K outputs are coupled to the receiver circuits 430 for processing the sequence of samples and converting to digital data. The digital data is provided to the high speed narrow band channel filter 450 for 2D object detection and per bin velocity compensation.

The high speed narrow band channel filter 450 receives the object bins 530 and 540 along with the digital data. The high speed narrow band filter is centred at the detected bins 530 and 540 for filtering. As a result, the two dimensional details of the objects are obtained from the high speed narrow band filters. For example, in the first mode, the ranges of the objects (like relative distance) are detected and in the mode two the features of the objects (like width and height) are determined. Thus the channel filter is used to extract the object specific information per antenna element for 2D reconstruction as against full available range 3D FFT employed in the conventional system. Further, since the range bins and velocity are detected in mode 1, object detection and velocity estimation happens with the highest signal to noise ratio or with least error, by utilizing data from all antenna elements. The complexity, processing time and power are reduced by adapting the filter to only the detected bins as against entire sample space in the conventional system.

For example, in the embodiments described above, the narrow band filter 450 manages/processes K×M×(number of relevant bins detected in mode 1). Considering 8×8 antenna array, receiver sampling rate of 81.92 MSPS (megapixels per second), and a 50 µs, the number of total range bins equals to 4096. The narrow band filter 450 may process only the 8×8×(5 or 6 bins/object) as against, a conventional filters that process the data of size equal to 8×8×4096 (total number of bins number of bins).

Figure 6A:
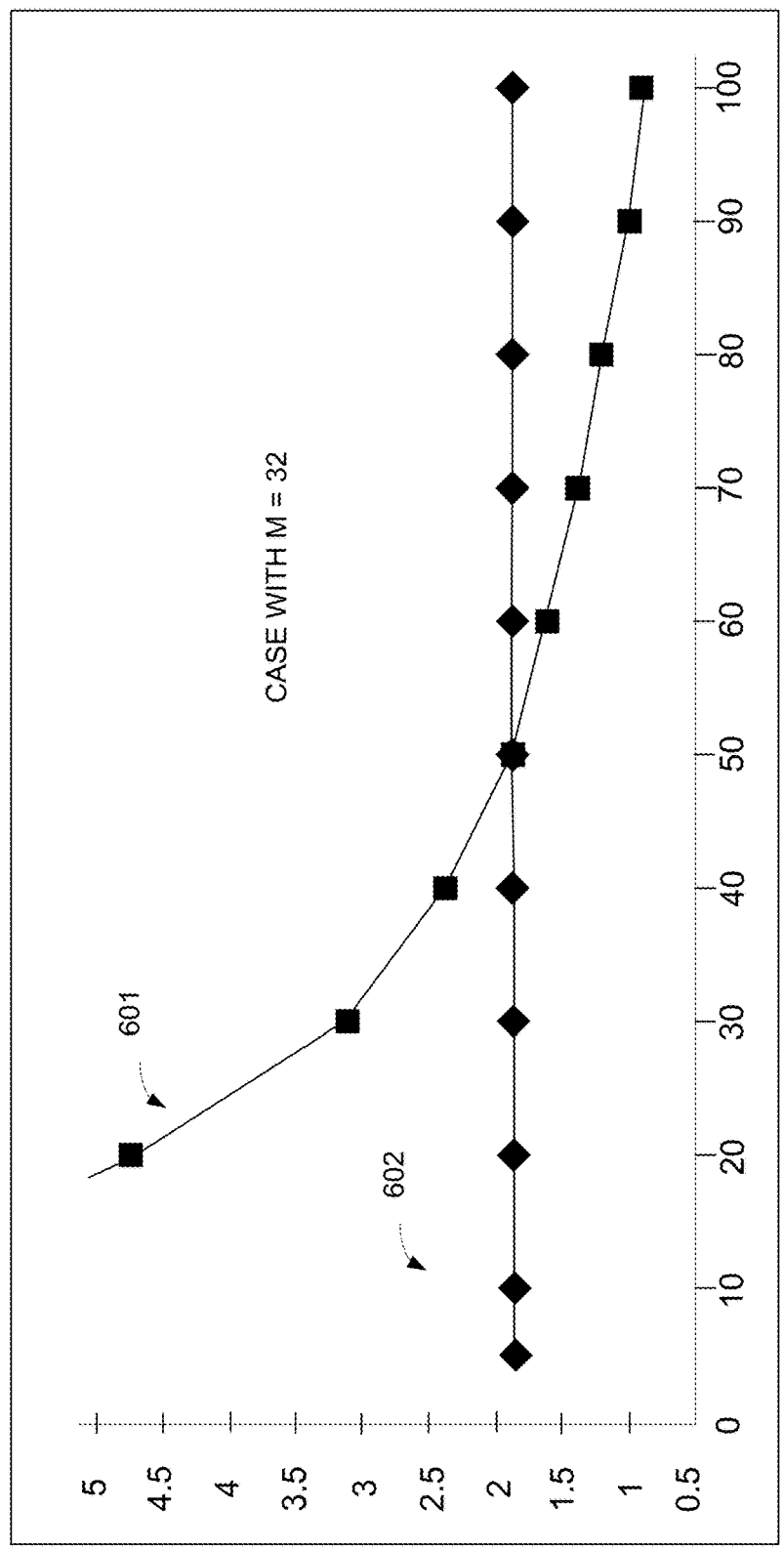
FIGS. 6A and 6B are graphs illustrating an example benefit of the transceiver in one embodiment.
Figure 6B:
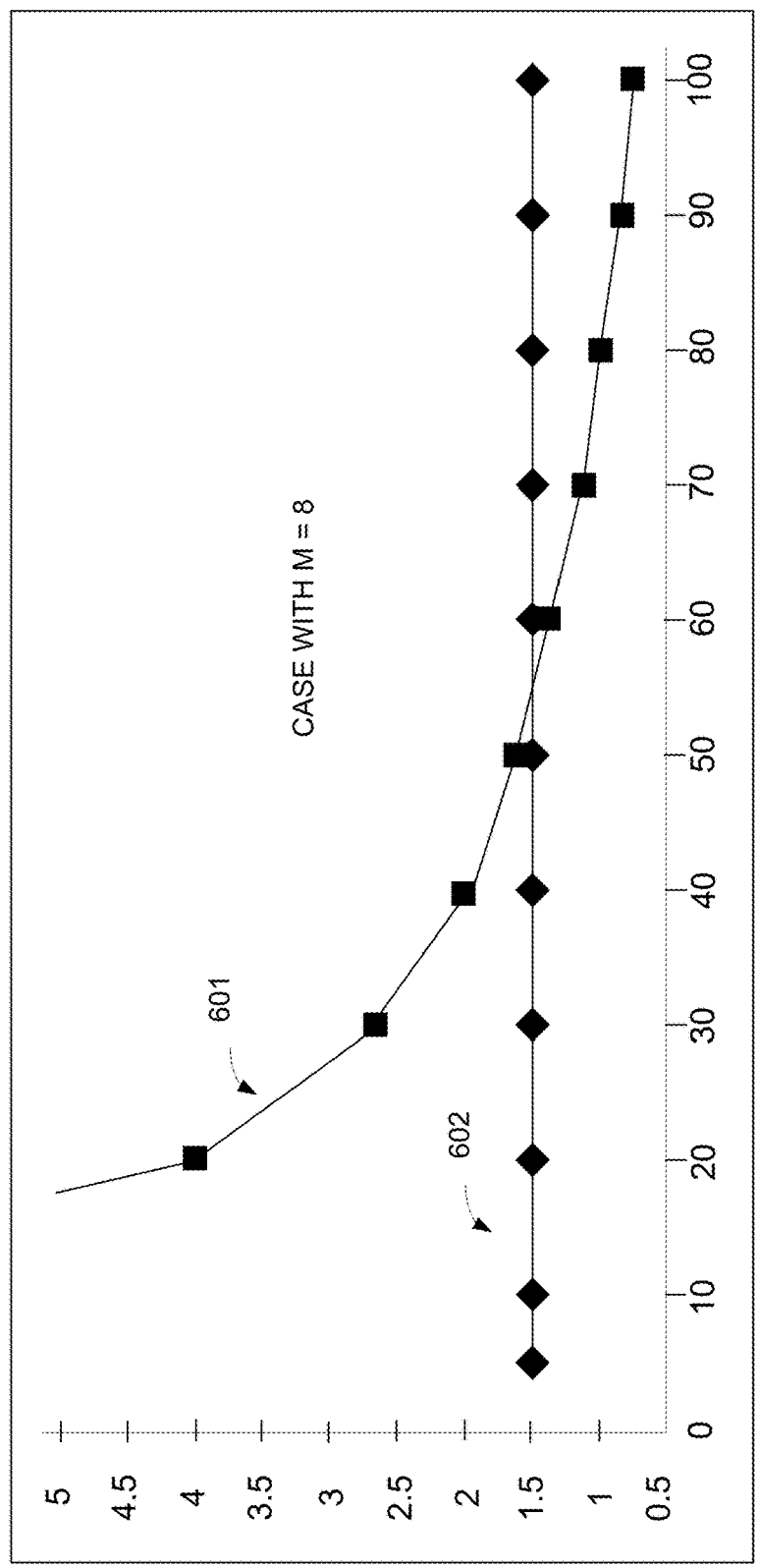

FIGS. 6A and 6B are graphs illustrating an example benefit of the transceiver in one embodiment. In the graphs, X-axis represents the percentage of space filled with the objects, Y-axis represents the number of times the calculation needed to capture and M represents the number of Antennas in the array. In that curve 601 represents computation ration of conventional 3D FFT technique and the embodiments of the present disclosure. As shown there, as the number of object in the space is lesser, the embodiments of the present disclosure reduce the computation by at least 80%. Curve 602 represents the computation ration of the conventional time switched antenna system that takes care of Doppler estimation inaccuracy. As shown there, the embodiments of the present disclosure reduce the computation 50% in some cases.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A Radar transceiver for an object detection comprising:
a two dimensional antenna array receiving plurality of a reflected radio frequency (RF) signals;
a mux-adder selectively adding the reflected RF signals in a first mode and selectively multiplexing the reflected RF signals in a second mode;
a range bin detector determining a valid range bins and velocity in the first mode; and
a three dimensional (3D) image reconstructor operating on the valid range bins to reconstruct a 3D image of the object in the second mode.

2. The radar transceiver of claim 1, wherein the two dimensional antenna array comprising antenna elements arranged in K rows and M columns, and the mux-adder adds a RF signal received on the M columns of an each row in the first mode.

3. The radar transceiver of claim 2, wherein the mux-adder multiplexes the RF signal received on the M columns of each row in the second mode.

4. The radar transceiver of claim 3, further comprising K number of circuit blocks each for adding corresponding RF signals received on the K rows in the first mode and multiplexing in the second mode.

5. The radar transceiver of claim 4, wherein the first mode is operative over a first chirp and the second mode is operative over M chirps.

6. The radar transceiver of claim 5, further comprising K number of RF receivers each converting the RF signal from the K number of circuit blocks to a digital data sequence.

7. The radar transceiver of claim 6, wherein the 3D image reconstructor comprises a high speed narrow band filter operative over the valid range bins.

8. The radar transceiver of claim 7, wherein the high speed narrow band filter extract a valid spectrum of the object using a relation:

$$\begin{bmatrix}\text{Valid per element}\\\text{per object data}\end{bmatrix} = \sum_{p=N1}^{N2} e^{j(-Vprx(n))} \sum_{n=0}^{N} RX(n*Ts) * e^{j(-\frac{2\pi pn}{N})}$$

in that N1 through N2 represents the valid range bins received from the mux-adder, N represents a total number of range bins, $RX(n*Ts)$ represents $n^{th}$ sample sampled at every Ts interval received per antenna elements in the two dimensional antenna array, Vprx represents phase velocity of a $p^{th}$ bin.

9. The radar transceiver of claim 8, wherein the range bin detector determine the valid range bins by employing a one dimensional Fast Fourier transform.

10. A method in a Radar transceiver comprising:
receiving plurality of a reflected radio frequency (RF) signals;

selectively adding the reflected RF signals in a first mode and selectively multiplexing the reflected RF signals in a second mode;

determining a valid range bins and velocity in the first mode; and operating on the valid range bins to reconstruct a 3D image of an object in the second mode.

11. The method of claim 10, wherein the plurality of the reflected RF signal is received through a two dimensional antenna array comprising antenna elements arranged in K rows and M columns, and adding a RF signal received on the M columns of each row in the first mode.

12. The method of claim 11, further comprising multiplexing the RF signal received on the M columns of each row in the second mode.

13. The method of claim 12, further comprising adding corresponding RF signals received on the K rows in the first mode and multiplexing in the second mode.

14. The method of claim 13, further comprising operating over a first chirp in the first mode and operating over M chirps in the second mode.

15. The method of claim 14, further comprising converting the RF signal from K number of circuit blocks to a digital data sequence.

16. The method of claim 15, further comprising extracting a valid spectrum of the object using a relation:

$$\begin{bmatrix} \text{Valid per element} \\ \text{per object data} \end{bmatrix} = \sum_{p=N1}^{N2} e^{j(-Vprx(n))} \sum_{n=0}^{N} RX(n*Ts) * e^{j(-\frac{2\pi pn}{N})}$$

in that N1 through N2 represents the valid range bins, N represents a total number of range bins, $RX(n*Ts)$ represents $n^{th}$ sample sampled at every Ts interval received per the antenna elements in the two dimensional antenna array, Vprx represents phase velocity of a $p^{th}$ bin.

17. The method of claim 16, further comprising determining the valid range bins by employing a one dimensional Fast Fourier transform.

* * * * *